(12) United States Patent
Sallas et al.

(10) Patent No.: US 9,413,733 B2
(45) Date of Patent: Aug. 9, 2016

(54) CONCURRENT DEVICE CONTROL

(71) Applicant: Comcast Cable Communications, LLC, Philadelphia, PA (US)

(72) Inventors: Michael Sallas, Radnor, PA (US); Christopher Stone, Newtown, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 99 days.

(21) Appl. No.: 14/303,048

(22) Filed: Jun. 12, 2014

(65) Prior Publication Data

US 2015/0365386 A1    Dec. 17, 2015

(51) Int. Cl.
*H04L 29/06*    (2006.01)
*H04L 29/08*    (2006.01)

(52) U.S. Cl.
CPC .......... *H04L 63/061* (2013.01); *H04L 67/1068* (2013.01)

(58) Field of Classification Search
USPC ........... 455/404.2, 404.1, 41.3, 68, 418, 41.2, 455/458, 151.4; 340/635, 825.69, 825.72, 340/825.25
See application file for complete search history.

(56) References Cited

U.S. PATENT DOCUMENTS

| | | | | |
|---|---|---|---|---|
| 2008/0066123 A1* | 3/2008 | Igoe | ..................... | H04L 12/2809 455/41.3 |
| 2009/0310570 A1* | 12/2009 | Smith | ................. | H04W 76/023 370/335 |
| 2011/0074591 A1* | 3/2011 | Arling | ................ | H04N 21/4126 340/635 |
| 2011/0212699 A1* | 9/2011 | Howard | .............. | H04M 1/7253 455/404.1 |
| 2011/0212702 A1* | 9/2011 | Howard | .............. | H04L 12/6418 455/404.2 |
| 2012/0163599 A1* | 6/2012 | Ware | ..................... | H04W 12/08 380/270 |
| 2013/0014194 A1* | 1/2013 | Fukui | ................ | G06F 17/30247 725/114 |

\* cited by examiner

*Primary Examiner* — Ganiyu A Hanidu
(74) *Attorney, Agent, or Firm* — Banner & Witcoff, Ltd.

(57) ABSTRACT

Methods, systems, and devices for controlling a plurality of electronic devices are disclosed. An accessory device may monitor one or more frequency bands to capture data transmitted between two devices during a pairing process. The accessory device may utilize data to capture subsequent RF signals transmitted from one of the devices. The accessory device may then intercept commands and data from multiple devices, establish pairing relationships with computing devices, and operatively control computing devices in accordance with the intercepted commands.

20 Claims, 5 Drawing Sheets

CONCURRENT DEVICE CONTROL

BACKGROUND

Wireless communication using infrared (IR) light has been used to control consumer electronics devices. A growing trend of technologies now use radio frequency (RF) to control devices. For example, the Zigbee radio frequency for consumer electronics ("RF4CE") standard provides a specification for high level communication protocols used to control various consumer electronics devices. There remains a need for increased functionality and flexibility for device control.

SUMMARY

The following summary is for illustrative purposes only, and is not intended to limit or constrain the detailed description.

Some aspect relate to operating a plurality of electronically controllable devices using an existing remote control device and wireless technology, wherein the remote control device is paired with a controllable device using a communication protocol that assumes a one-to-one relationship in the paired devices. To achieve this, an additional device may listen to, or eavesdrop on, the pairing communications between the remote control device and its paired controllable device, and may then capture and respond to the RF commands sent between the paired devices. Some aspects of this disclosure relate to monitoring one or more frequency bands for pairing information transmitted between remote control devices and target computing devices. Further aspects of this disclosure relate to systems and methods for permitting an accessory device to establish pairing relationships with multiple remote control devices, intercept commands and data from multiple remote control devices, and operate other target computing devices in accordance with the intercepted commands.

In an exemplary embodiment of the present disclosure, this is achieved by intercepting pairing information transmitted between a first remote control device and a first target device during a pairing process, such as an RF4CE pairing process. A computing device, such as an accessory device, may capture the pairing information and establish an intercepting relationship with the first remote control device. The accessory device may identify, and subsequently form a pairing relationship with, one or more other target computing devices. The accessory device may associate one or more commands, (e.g., button commands, voice commands, physical gestures, etc.) for the first remote control device with the one or more other target computing devices. The accessory device may continue to monitor one or more frequency bands for command signals transmitted from the first remote control device, and may transmit corresponding command signals to a second target device such that the accessory device may wirelessly control the second target device in accordance with the command signals received from the first remote control device. In another aspect, the accessory device may monitor one or more frequency bands for command signals transmitted from a second remote control device, and may establish an intercepting relationship with the second remote control device.

In yet another aspect, the accessory device may be configured to adjust a mode or state of the first target device, such that the first target device may ignore one or more command signals associated with and/or intended for other target computing devices. In still another aspect, the accessory device may be configured to provide a user interface for configuring various functions, parameters, and operations for the accessory device. In this way, among many others, the user may customize which remote control device commands are associated with certain target computing devices. In another aspect, the accessory device may be integrated within a target computing device, such that the target computing device incorporates the functionality of the accessory device.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
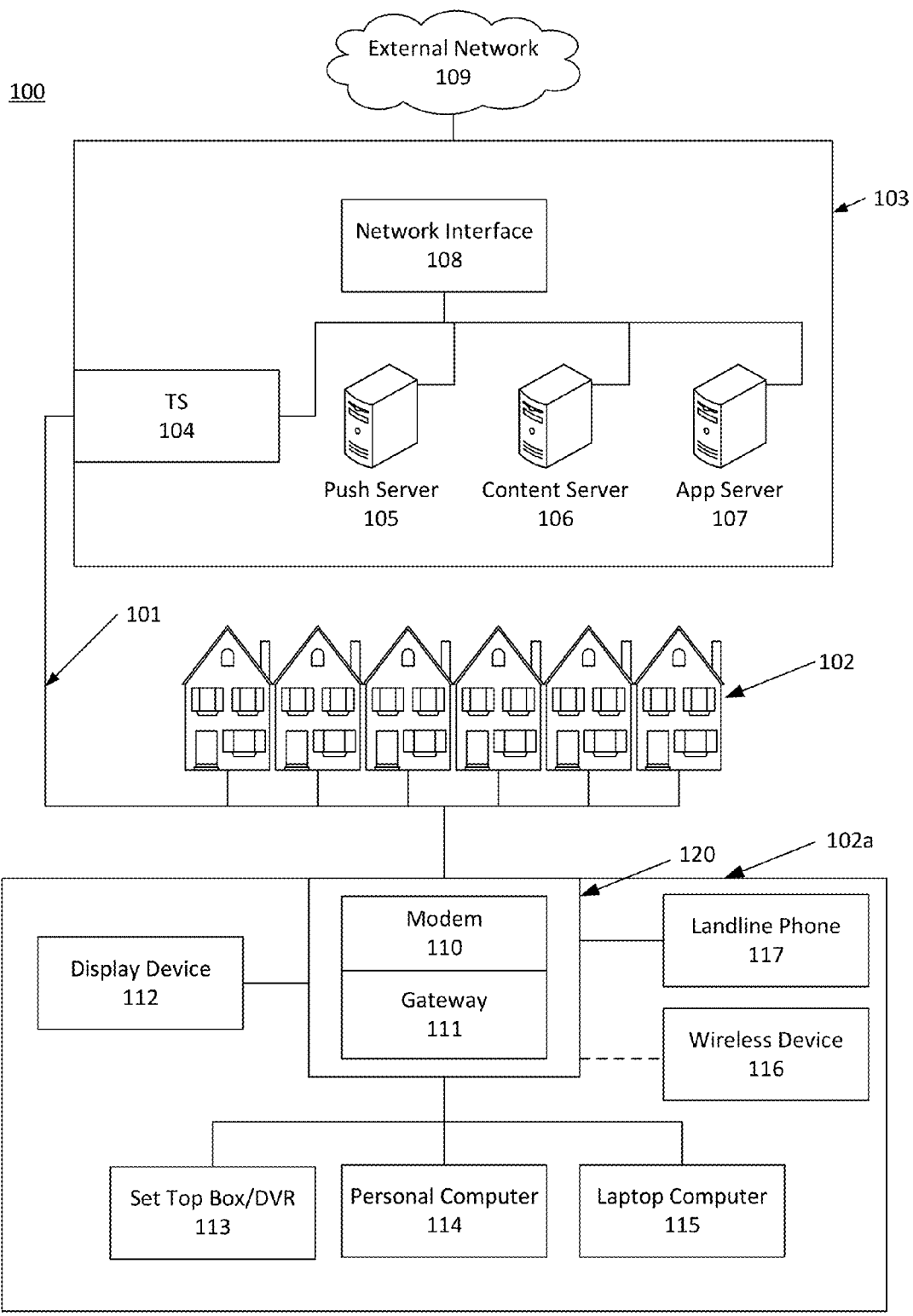
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 112, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
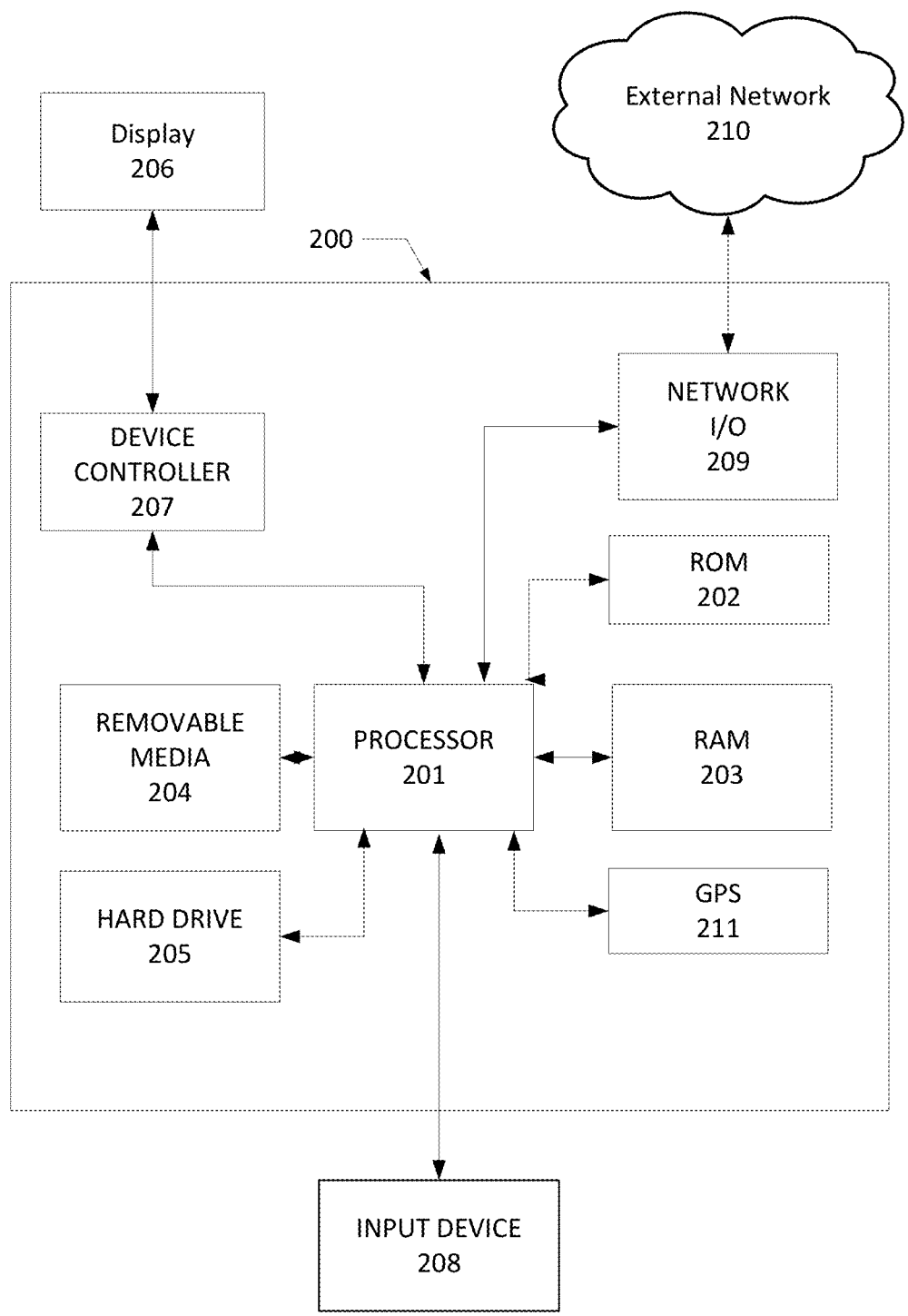
FIG. 2 illustrates an example computing device and software configuration that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

FIG. 2 is an example computing device having a hardware and/or software configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
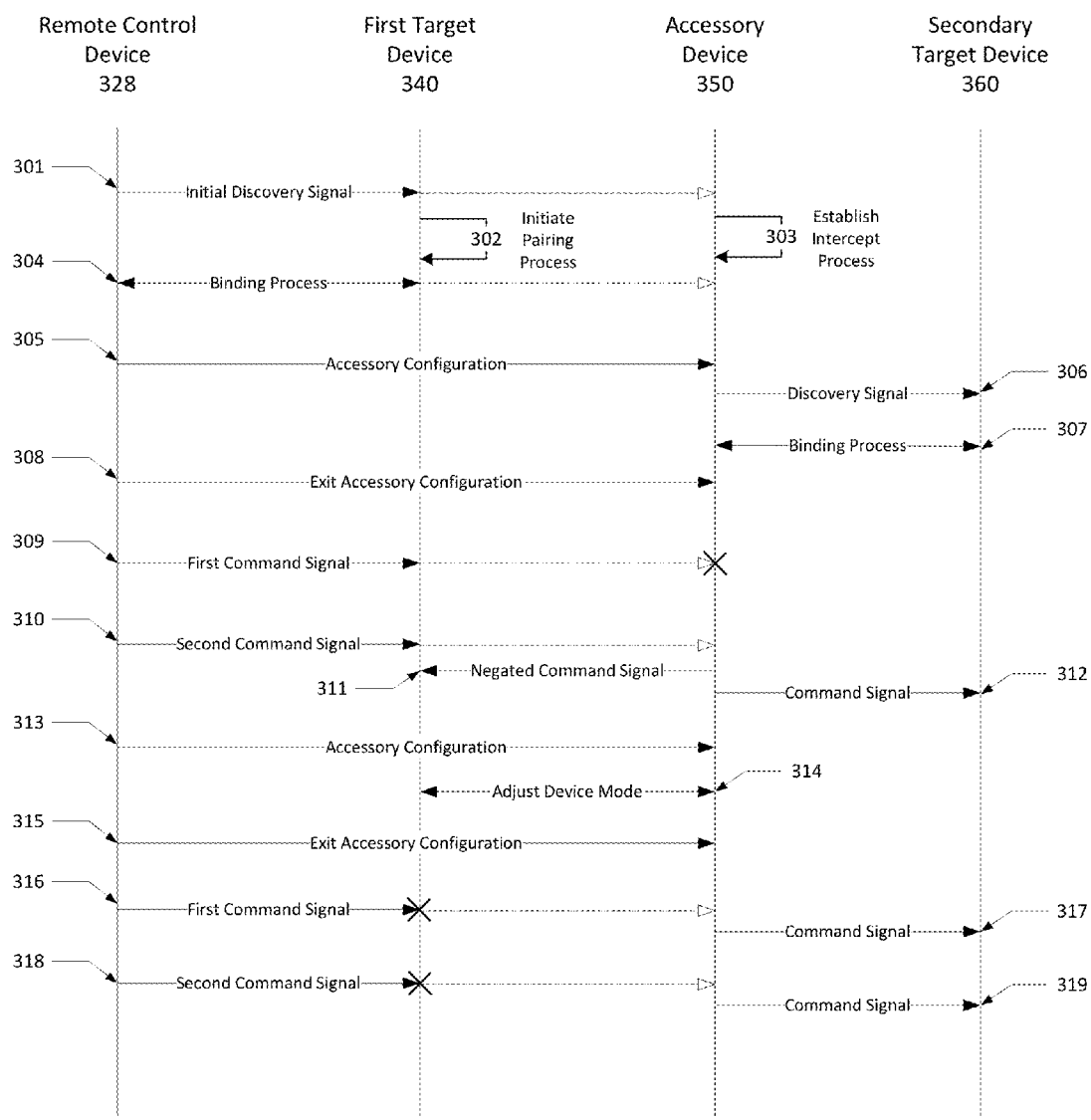
FIG. 3 illustrates an exemplary signaling flow chart of a pairing and device communication process in accordance with one or more aspects of the present disclosure.

FIG. 3 illustrates an exemplary signaling flow chart of a pairing and device communication process in accordance with one or more aspects of the present disclosure. The pairing and device communication process may be implemented by any computing devices in an environment where one or more computing devices provide commands to other computing devices (e.g., a remote control device providing commands to a target or control device). For example, the pairing and device communications process may be implemented using various electronically controllable devices and wireless PAN technology. In particular FIG. 3 depicts a flow of communication and command signals transmitted between various computing devices including a remote control device 328, a first control device 340, an accessory device 350, and a secondary target device 360.

Remote control device 328 may be a radio frequency ("RF") remote control device. In some embodiments, remote control device 328 may have the same or similar functionality as user input device 208 described above. The remote control device is equipped to transmit RF signals to one or more computing devices over a network. The remote control device may be equipped to process a variety of different command inputs, such as button commands, voice commands, physical gestures, etc. Such command inputs may be used to generate command signals to a computing device, such as first target device 340. For example, the volume up (+) command button may be configured to transmit from the remote control device a command signal to increase the volume at first target device 340. Similarly, the remote control device may be configured to process a "volume up" voice command to transmit a command signal to increase the volume at first target device 340. As another example, the channel up (+) command button on a remote control device may be configured to cause the remote control device to transmit a button command signal to increment a channel at target device 340. In some embodiments, the remote control device may be equipped with a plurality of command buttons, with each button corresponding to one or more particular commands.

In other embodiments, the remote control device, or other suitable computing device operatively connected to the remote control device, may be equipped with one or more devices, (e.g., a camera, gyroscope, accelerometer, etc.), to capture one or more physical gestures of a user. The remote control device, or other suitable computing device, maybe configured to process the physical gesture, and associate each gesture with a particular command. The remote control device may be further configured to transmit a command signal corresponding to the physical gesture command. In some embodiments, the remote control device, or other suitable computing device, may be programmed to recognize and associate predetermined physical gestures with particular remote control device commands. In other embodiments, the remote control device, or other suitable computing device, may be programmed to recognize the location of one or more users in a room. For example, first target device 340 may receive position data from an image capture device operatively coupled to first target device 340. First target device 340 may process the position data to determine whether to ignore certain commands from a remote control device.

First target device 340 may be any type of computing device capable of being operatively controlled by a remote control, such as remote control device 328. In one embodiment, first target device 340 may comprise gateway 111. In another embodiment, first target device 340 may comprise STB 112. In other embodiments, first target device 340 may be configured to establish a pairing relationship with remote control device 328, such that remote control device 328 can communicate with and/or control first target device 340 over the network. Secondary target device 360 may be any type of computing device capable of receiving RF command signals from a remote control device. In some embodiments, secondary target device 360 may comprise a digital video recorder (DVR), an audio/visual device, a home security system, or any other suitable computing device capable of receiving and/or being operatively controlled by RF signals.

Accessory device 350 may be a computing device configured to receive and transmit RF signals over a network, to monitor (e.g., eavesdrop on) a pairing communication between the remote control device 328 and the target device 340, and to ultimately intercept and act on commands sent from the remote control device 328 to the target device 340. In one embodiment, accessory device 350 may include a control signal transmitter, and preferably, at least one control signal receiver. In some embodiments, accessory device 350 may be physically and/or operatively engaged to first target device 340. Accessory device 350 can be in any suitable form, such as a USB "dongle," an HDMI "dongle," or the like. In embodiments where accessory device 350 is physically engaged to a computing device, accessory device 350 may be configured to transmit control commands, such as a consumer electronics control ("CEC") command, to first target device 340.

In other embodiments, accessory device 350 may be capable of transmitting information to first target device 340 for subsequent display on a display device, such as display device 112 or display device 206. In one of these embodiments, accessory device 350 may provide a user with a device configuration interface. The device configuration interface may provide a variety of menus and status indications relating to accessory device 350 for navigation by a user. The various menus and options provided on the device configuration interface may permit the user to control one or more functions of the accessory device. For example, a user may identify one or more target computing devices for the accessory device to communicate with, such as secondary target device 360. As another example, a user may associate certain commands for a remote control device with the one or more identified target computing devices. For example, the user can correlate remote control commands with different target devices (e.g., asking that volume controls be associated with the user's stereo, while channel change commands are associated with the user's STB. As yet another example, a user may identify a particular command sequence for the remote control device that may cause the accessory device to initiate a device configuration interface. The interface may also include menus and status information relating to one or more target computing devices detected by and/or already in communication with accessory device 350.

In other embodiments, accessory device 350 may be integral to a computing device, such as secondary target device 360. For example, televisions, speakers, security systems, or other audio/visual devices may be manufactured to contain a computing device, such as accessory device 350, integrally formed within the device. In some embodiments, accessory device 350 may be configured to communicate, over a network, with a plurality of computing devices. In one of these embodiments, accessory device 350 may be configured to communicate with (e.g., receive and/or transmit data) a remote control device, such as remote control device 328. In another of these embodiments, accessory device 350 may be configured to communicate with a computing device, such as first target device 340.

Referring now to FIG. 3, this flowchart illustrates the various RF signal and data paths relating to a series of pairing relationships and command operations for an exemplary method according to one or more embodiments of the disclosure. As illustrated by element 301, a remote control device, such as remote control device 328, may attempt to initiate a pairing process with one or more computing devices by transmitting an initial discovery signal to the one or more computing devices, such as first target device 340. Remote control device 328 may transmit the initial discovery signal subsequent to the initiation of one or more commands.

After receiving the initial discovery signal, one or more computing devices, such as first target device 340, may initiate a pairing process, such as an RF4CE pairing process, with remote control device 328. As illustrated by element 302, first target device 340 may initiate the pairing process with remote control device 328 by transmitting a discovery confirmation or response signal to remote control device 328. In some embodiments, remote control device 328 may receive a plurality of discovery response or confirmation signals from one or more computing devices. Remote control device 328 may receive a discovery response or confirmation signal from first target device 340. Remote control device 328 may store in memory information relating to the discovery response signal transmitted from first target device 340.

In some embodiments, remote control device 328 may receive information identifying a device type for a computing device transmitting the discovery response signal, such as first target device 340. In other embodiments, remote control device 328 may request device type information from a computing device, such as first target device 340. In one embodiment, first target device 340 may transmit a discovery response signal to a remote control device, such as remote control device 328, if one or more predetermined conditions are met. For example, first target device 340 may transmit a discovery response signal if a requested device type parameter in the initial discovery signal matches the device type of first target device 340. As another example, first target device 340 may transmit a discovery response signal if a vendor identifier parameter in the initial discovery signal matches the vendor identifier of first target device 340.

In some embodiments where the transmission of the discovery response is successful, a computing device, such as first target device 340, may wait a predetermined time period for additional information to be transmitted from remote control device 328. In one of these embodiments, first target device 340 may wait for additional pairing information to be transmitted from the remote control device. In another embodiment, a computing device may ignore an initial discovery signal from a remote control device if the one or more predetermined conditions are not met. In yet another embodiment, accessory device 350 may be configured to identify data transmitted from one or more remote control devices, such as remote control device 328. For example, a manufacturer may program the accessory device to identify data (e.g., discovery signal) transmitted from a remote control device by obtaining a MAC address or other unique identifier for that device.

In embodiments where a remote control device receives a discovery response signal from a plurality of computing devices, the remote control device may be configured to determine a listing of potential pairing candidate devices by ranking the plurality of computing devices that transmitted a discovery response signal. In some embodiments, the remote control device may be configured to use an algorithm to determine the ranking for the plurality of computing devices. In other embodiments, the remote control device may utilize information relating to the potential pairing candidates to generate one or more pairing tables. The pairing tables may be utilized by the remote control device to identify pairing relationships with one or more devices in the plurality of computing devices that transmitted a discovery response signal. The pairing table(s) may include a separate pairing entry associated with each of the potential pairing candidate devices.

As depicted by element 303, accessory device 350 may initiate an intercept process after detecting or intercepting a discovery signal from a remote control device. Accessory device 350 may be configured to identify the one or more frequency bands utilized by remote control device 328 to communicate with first target device 340. As illustrated by the dotted lines from first target device 340 to accessory device 350 in FIG. 3, accessory device 350 may be configured to monitor the frequency band utilized by a remote control device to transmit an initial discovery signal to one or more computing devices, e.g., first target device 340. Accessory device 350 may be configured to capture and store in memory information relating to the initial discovery signal transmitted from remote control device 328. The frequency band(s) may be established, for example, by a wireless protocol used by the remote control and target device.

In some embodiments where accessory device 350 receives an initial discovery signal from a remote control device, such as remote control device 328, accessory device 350 may continue to monitor the frequency band on which the initial discovery signal was transmitted for additional information, such as pairing information. For example, accessory device 350 may continue to monitor the frequency band for a discovery response signal transmitted from one or more computing devices, such as first target device 340, in response to the initial discovery signal. Accessory device 350 may be configured to capture and store in memory information relating to the discovery response signal transmitted from a computing device, such as first target device 340. As will be discussed further below, accessory device 350 may be configured to monitor, sequentially or simultaneously, a plurality of frequency bands to identify a signal transmitted from a computing device in response to the discovery signal transmitted from a remote control device. In some embodiments, after capturing a discovery response signal, accessory device 305 may be configured to monitor a frequency band for a pairing request transmitted from a remote control device.

As depicted by element 304, remote control device 328 may perform a pairing process with a computing device, such as first target device 340. In one embodiment, a remote control device may initiate a pairing process with first target device 340 based on a pairing protocol, such as an RF4CE pairing protocol. In other embodiments, a remote control device may initiate a pairing process with one or more computing devices that successfully transmitted a discovery response signal to the remote control device. In other embodiments, a remote control device may initiate a pairing process (e.g., an RF4CE pairing process) with a highest ranked computing device based on a listing of potential pairing candidate devices.

During the pairing process, remote control device 328 may transmit a pairing request to first target device 340 to establish a temporary pairing with first target device 340. After receiving the pairing request from remote control device 328, first target device 340 may transmit a pairing response and other data to remote control device 328. Accessory device 350 may capture (e.g., intercept) pairing information transmitted between remote control device 328 and first target device 340. In embodiments where remote control device 328 does not receive a pairing response or confirmation signal from a computing device, such as first target device 340, remote control device 328 may attempt to setup a temporary pairing relationship with another computing device that responded to the initial discovery signal. In one of these embodiments, remote control device 328 may attempt to setup a temporary pairing relationship with the next highest ranked computing device in the list of potential pairing candidate devices.

It is to be understood that devices, such as a remote control device, may encrypt data that is transmitted to another computing device (e.g., an encrypted command signal). In addition, communication networks may require encryption of data transmitted over the network. As result, devices operating under these or other security restrictions may need to perform one or more key exchanges to communicate with other devices. For example, in some embodiments, after receiving a pairing response or confirmation signal from first target device 340, remote control device 328 may initiate a key exchange with first target device 340 to obtain a pairing key. In some embodiments, first target device may be configured to transmit one or more pairing keys to remote control device 328 during the key exchange. Accessory device 350 may be configured to capture any pairing key(s) and other key exchange information transmitted between remote control device 328 and first target device 340. During the pairing process, remote control device 328 may initiate a validation process with first target device 340. During the validation process, remote control device 328 may periodically transmit a check validation request (e.g., PING request) to first target device 340. After receiving the check validation request, first target device 340 may check the result of the validation process (e.g., determine whether the validation was a success, a failure, or aborted), and transmit a check validation response to remote control device 328. Accessory device 350 may capture (e.g., intercept) data transmitted between remote control device 328 and first target device 340 during the validation process.

In embodiments where the validation process is unsuccessful, the remote control device may be configured to remove a pairing entry from the pairing table corresponding to the invalid target computing device. In one of these embodiments, remote control device 328 may be configured to attempt to setup a temporary pairing relationship with the next highest ranked computing device in the list of potential pairing candidates. In embodiments where the validation process is aborted, the remote control device may be configured to terminate the pairing process.

In embodiments where the validation process is successful, the remote control device may establish a permanent pairing relationship with the target computing device. For example, referring to step 304, remote control device 328 may establish a permanent pairing relationship with first target device 340, and remote control device 328 may be considered bound or paired to first target device 340. In one of these embodiments, a computing device, such as first target device 340, may generate a pairing table to store pairing, key, and validation information captured during the pairing process. In another of these embodiments, accessory device 350 may generate a similar pairing table to store information captured during the pairing process between remote control device 328 and first target device 340. In one embodiment, accessory device 350 may establish a pairing relationship with first target device 340.

In some embodiments, accessory device 350 may be configured to initiate a device configuration mode. As discussed in more detail further below, the device configuration mode may permit a user to access a device configuration interface for adjusting one or more parameters or functionalities of the accessory device. In some embodiments, accessory device 350 may output to a display device the device configuration interface. In one of these embodiments, the display device may be operatively coupled to first target device 340. For example, first target device 340 may comprise a set-top-box that outputs content to the display device for consumption. Accessory device 350 may transmit data to first target device 340 for output to the display device. For example, accessory device 350 may transmit data to first target device 340 such that an overlay of the device configuration interface is presented on the display device.

There are a variety of ways in which the accessory device may initiate a device configuration mode. In one embodiment, the accessory device may be configured to initiate a device configuration mode upon initialization (e.g., a boot) of the accessory device. For example, accessory device 350 may be configured to enter a device configuration mode the first time accessory device 350 is physically and/or operatively engaged to a computing device, such as first target device 340. As another example, accessory device 350 may be configured to initiate a device configuration mode upon a boot of the accessory device. In another embodiment, accessory device 350 may be configured to initiate a device configuration mode after detecting a command signal or a predetermined series of command signals from a remote control device. For example, the accessory device may be configured to recognize a particular sequence of button or other commands (e.g., 1-2-ARROW UP-1), and upon receiving this sequence of commands, the accessory device may initiate a device configuration mode. As another example, the accessory device may be configured to recognize a particular command signal (e.g., a button command, a voice command, commands corresponding to one or more physical gestures), and upon receiving the command the accessory device may initiate a device configuration mode.

In yet another embodiment, accessory device 350 may be configured to initiate a device configuration mode after receiving a particular setup code from a remote control device. For example, the accessory device may recognize a particular setup code that will initiate a device configuration mode. In this example, the setup code may comprise actuating the setup command button on the remote control device for a predetermined period of time, and then actuating a series of command buttons (e.g., 9-3-5). As illustrated by element 305, remote control device 328 may transmit a signal or signals to accessory device 350 to initiate a device configuration mode.

As discussed in more detail below, the device configuration mode for accessory device 350 may provide the user with a variety of options or menus on an interface for adjusting one or more functionalities of the accessory device. For example, the device configuration mode may present the user with an option to manually identify a list of target computing devices for establishing a pairing relationship. As another example, the device configuration mode may present the user with an option to automatically search for potential target computing devices for establishing a pairing relationship. In some embodiments, the accessory device may be configured to intercept certain command signals while in the device configuration mode, such that the user may navigate through the device configuration interface. For example, when the accessory device enters the device configuration mode, the accessory device may automatically begin to intercept arrow button command signals (e.g., up, left, right, or down arrow button commands) transmitted from a remote control device. In one of these embodiments, after the accessory device exits the device configuration mode, the accessory device may no longer intercept the arrow button command signals. As another example, when the accessory device enters the device configuration mode, the accessory device may automatically begin to intercept signals transmitted from the remote control device that correspond to voice commands or physical gestures commands. In one of these embodiments, after the accessory device exits the device configuration mode, the accessory device may no longer intercept the command signals corresponding to voice commands and physical gesture commands.

In some embodiments, accessory device 350 may be configured to transmit a discovery signal to one or more computing devices. As illustrated by element 306 in FIG. 3, accessory device 350 may transmit a discovery signal to a computing device, such as secondary target device 360. In some embodiments, accessory device 350 may transmit a discovery signal to one or more computing devices identified with the device configuration interface. For example, for each pairing candidate device identified by accessory device 350, the device configuration interface may provide a user the option of establish a pairing relationship with the pairing candidate device. In some embodiments, accessory device 350 may transmit a discovery signal to the one or more computing devices selected by a user for establishing a pairing relationship.

Accessory device 350 may be configured to receive discovery response signals from a plurality of computing devices. The plurality of computing devices may comprise any number of target computing devices (other than first target device 340) that may be operatively controlled by a remote control device, such as remote control device 328. For example, secondary target device 360 may be an audio device, such as a speaker. Accessory device 350 may store in memory information relating to each device in the plurality of computing devices that transmitted a discovery response or confirmation signal to accessory device 350. Accessory device 350 may utilize such information to determine a list of potential pairing candidate devices.

As illustrated by element 307 in FIG. 3, accessory device 350 may establish a pairing relationship with a computing device, such as secondary target device 360. Accessory device 350 may be configured to establish a pairing relationship by initiating a pairing process in accordance with a pairing protocol. The pairing process that occurs between accessory device 350 and secondary target device 360 may be similar to the pairing process depicted at element 304. During this process, accessory device 350 and secondary target device 360 may communicate and store various pairing, key, and validation information. After a successful pairing process, secondary target device 360 may be considered bound or paired to accessory device 350, such that accessory device 350 may operatively control and/or communicate with secondary target device 360.

As illustrated by element 308, accessory device 350 may exit a device configuration mode. There are a variety of ways in which accessory device 350 may exit the device configuration mode. For example, accessory device 350 may exit the device configuration mode via one or more menus or options available to a user within the device configuration interface. As another example, the accessory device may be configured to exit the device configuration mode after receiving a command signal or a predetermined series of one or more command signals from a remote control device. As illustrated by element 308, remote control device 328 may transmit a signal to accessory device 350 to exit the device configuration mode.

In some embodiments, the device configuration mode for accessory device 350 may permit a user, via a device configuration interface, to associate one or more commands for a remote control device with one or more target computing devices identified by the accessory device. For example, while each command button for remote control device 328 may be initially associated with first target device 340, a user may adjust device configuration settings for accessory device 350 such that the volume up (+) and/or the volume down (−) command buttons may be associated with a computing device other than first target device 340. For instance, a user may adjust one or more configuration settings for accessory device 350 such that the volume up (+) and/or the volume down (−) command buttons for remote control device 328 may be associated with secondary target device 360. As another example, the mute command button and/or certain arrow keys for remote control device 328 may be associated with secondary target device 360. For instance, a user may adjust one or more configuration settings for accessory device 350 such that the mute command button for remote control device 328 may be associated with secondary target device 360. By distinguishing the various command from remote control device 328 that are intended for either first target device 340 or a different computing device, (e.g., second target device 360), accessory device 350 may determine whether to ignore particular sets of command signals transmitted from remote control device 328. As will be appreciated, the device configuration interface may also provide the user with options for identifying which type of command (e.g., button command, voice command, physical gesture command, etc.) may be associated with particular functions or operations of a computing device, such as first target device 340 or secondary target device 360.

In some embodiments, as illustrated by element 309 in FIG. 3, accessory device 350 may ignore command signals intended for a computing device, such as first target device 340. For example, accessory device 350 may ignore a first command signal (e.g., a channel up (+) button, voice, or physical gesture command) transmitted from remote control device 328 to first target device 340. In this example, the channel up (+) command signal is intended for and/or associated with first target device 340. As illustrated by the dotted lines at element 309, accessory device 350 may intercept (e.g., capture) the channel up (+) command signal transmitted from remote control device 328 to first target device 340. Accessory device 350 may ignore the transmitted channel up (+) command signal because this signal is intended for and/or associated with first target device 340, rather than some other another target computing device (e.g., secondary target device 360). Referring to element 309 in FIG. 3, accessory device 350 ignoring the intercepted channel up (+) command signal is depicted by the command signal being crossed-out at accessory device 350.

In other embodiments, accessory device may be configured to respond to command signals intended for and/or associated with a computing device other than first target device 340, such as secondary target device 360. In some embodiments, accessory device 350 may respond to a command signal transmitted from remote control device 328 by sending a corresponding command signal to the respective computing device associated with the command signal. For example, accessory device 350 may respond to a volume up (+) command signal transmitted from remote control device 328 by sending a corresponding signal to the computing device intended to receive and/or associated with the volume up (+) signal (e.g., secondary target device 360). However, in this example, if secondary target device 360 is not associated with the volume up (+) command, accessory device 350 may be configured to ignore the volume up (+) command signal transmitted from remote control device 328.

Referring back to FIG. 3, since remote control device 328 and first target device 340 have established a pairing relationship, first target device 340 may be configured to receive and be operatively controlled by command signals transmitted from remote control device 328, including any command signals that may be intended for and/or associated with a different computing device, such as secondary target device 360. For example, although accessory device 350 may associate a volume up (+) command signal with a computing device other than first target device 340, (e.g., secondary target device 360), and may capture this signal for forwarding to the appropriate computing device, first target device 340 may still receive and attempt to perform the volume up (+) command transmitted from remote control device 328.

There are a variety of ways for the system to mitigate the impact of command signals received by a target computing device, such as first target device 340, which are intended for other computing devices. For example, to mitigate the impact of command signals received by first target device 340 that are intended for other computing devices, accessory device 350 may be configured to transmit a negating command signal to the first target device 340. In some embodiments, accessory device 350 may send the negating command immediately after intercepting or capturing a command signal transmitted from remote control device 328 that is intended for a computing device other than first target device 340. For instance, as illustrated by element 310 in FIG. 3, remote control device 328 may transmit a second command signal (e.g., a volume up (+) command signal) intended for secondary target device. First target device 340 may receive the second command signal transmitted from remote control device 328, and accessory device 350 may intercept the second command signal as illustrated by the dotted lines depicted at element 310. As depicted by element 311, after intercepting the second command signal, accessory device 350 may transmit a negating command (i.e., a volume down (–) command) to first target device 340 to mitigate the impact of the second command signal (e.g., the volume up (+) command signal) received by first target device 340. After sending the negating command signal to first target device 340, accessory device 350 may transmit a corresponding volume up (+) command signal to secondary target device 360, as illustrated by element 312. To support the negating commands, the accessory device 350 may store a table identifying various commands that the remote control 328 can send to a target device, and a corresponding negating command that would instruct the target device to undo the command to be negated. For example, the table may indicate that volume up (+) commands maybe negated by a volume down (–) command, a channel change command may be negated by a last or previous channel command, etc.

As another example, to mitigate the impact of command signals received by first target device 340 that are intended for other computing devices, a mode or state for a computing device, such as first target device 340, may be adjusted to indicate that the device may ignore certain commands from remote control device 328. In one embodiment, a computing device, such as first target device 340, may utilize one or more vectors of Boolean operators to represent one or more commands from a remote control device. A computing device, such as accessory device 350, may be configured to adjust a state of a Boolean operator corresponding to the particular command to be ignored.

In some embodiments, accessory device 350 may be configured to adjust the mode or state of a computing device to indicate that certain command signals may be ignored. In one of these embodiments, a user may utilize a device configuration interface to identify the one or more command signals for a computing device, such as first target device 340, to ignore. In embodiments where accessory device 350 comprises an HDMI dongle and is operatively coupled (e.g., physically engaged) to the computing device, accessory device 350 may adjust the mode or state of the computing device by transmitting an HDMI-Consumer Electronics Control ("CEC") command to the computing device. In other embodiments, remote control device 328 may be configured to adjust the mode or state of a computing device (e.g., first target device 340) by transmitting a command signal. In another embodiment, a computing device, such as first target device 340, may provide the user with a device configuration interface for adjusting a mode or state of the computing device. This interface may also provide options for identifying one or more command signals for the computing device to ignore.

Referring to element 313 in FIG. 3, remote control device 328 may send a signal to initiate a device configuration mode for accessory device 350. As noted above, a user may access a device configuration interface for accessory device 350 to adjust the mode or state of first target device 340. As illustrated by element 314, a mode or state for first target device 340 may be adjusted to indicate that first target device 340 may ignore the volume up (+) and volume down (–) command signals from remote control device 328. Similarly, a mode or state for first target device 340 may be adjusted to indicate that first target device 340 may ignore the channel up (+) command signal from remote control device 328. Additionally, the device configuration interface for accessory device 350 may be used to associate the channel up (+) command with secondary computing device 360. As depicted by element 315, remote control device 328 may transmit a signal to accessory device 350 to exit the device configuration mode.

As illustrated by element 316, a state for first target device 340 has been adjusted such that first target device 340 may ignore the first command signal (e.g., the channel up (+) command signal) transmitted from remote control device 328. Accessory device 350 may intercept the first command signal, as illustrated by the dotted lines at element 361, and may transmit a corresponding command signal to secondary target computing device 360, as illustrated by element 317. At element 318, remote control device 328 may transmit a second command signal (e.g., a volume up (+) command signal) intended for secondary target device 360. As discussed above, a state for first target device 340 has been adjusted such that first target device 340 may ignore the second command signal (e.g., the volume up (+) command signal) from remote control device 328, as illustrated by the second command signal in element 318 being crossed out at first target device 340. Unlike the prior transmission of the second command signal depicted by elements 310 and 311, accessory device 350 does not send a negating command to mitigate the impact of the volume up (+) command being received at first target device 340. Accessory device 350 may intercept the second command signal, as illustrated by the dotted lines at element 318, and may transmit a corresponding command signal to secondary computing device 360, as illustrated by element 319.

Figure 4:
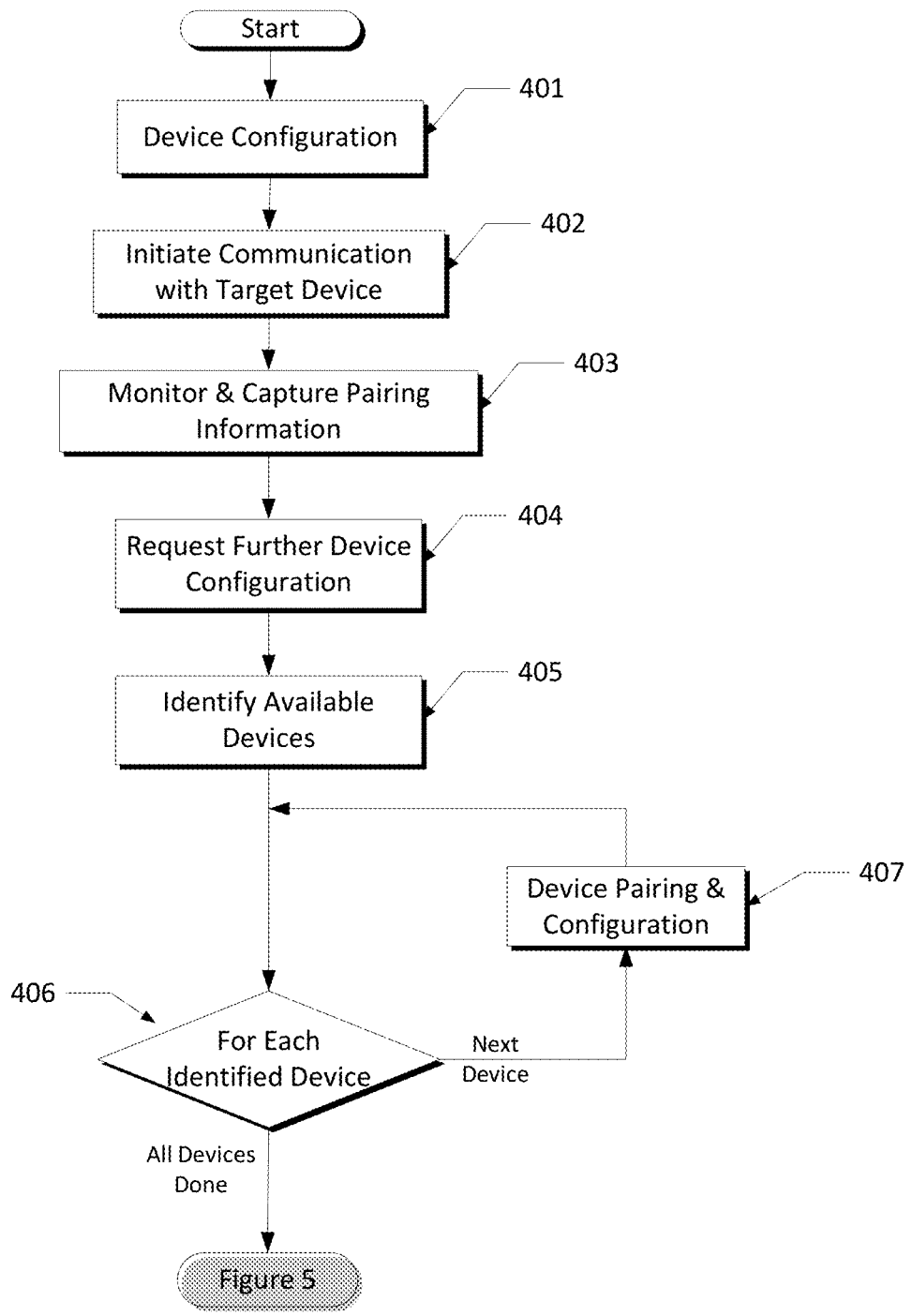
FIG. 4 illustrates an exemplary flow chart of a method in accordance with one or more aspects of the present disclosure.

FIG. 4 depicts a flowchart for an exemplary method according to one embodiment of the disclosure, which can be performed by one or more computing devices such as an accessory device 350 or any other desired computing device. When describing the steps of the method below, the term "system" will be used when referring to each component, either singularly or collectively, employed at each step of the method. Such usage is merely for ease in discussing the method, and should not be interpreted as limiting the exact embodiment in which the following method may be performed.

Referring now to FIG. 4, at step 401, an initial device configuration may be performed. During step 401, a computing device, such as accessory device 350 may be configured to electronically communicate with one or more computing devices. In some embodiments, the accessory device may be configured to operate under the Zigbee RF4CE communication protocol. In other embodiments, the configuration step may include the manufacture configuring and/or programming the accessory device to be capable of performing particular sets of operations and functions. For example, the accessory device may be configured to store in memory a device configuration software application. The application may provide the user with a device configuration interface that may include a series of menus and options for configuring the accessory device. For example, the device configuration interface may provide a menu for configuring the accessory device to identify one or more target computing devices, such as secondary target device 360.

As another example, the device configuration interface may provide one or more options for configuring the accessory device to identify one or more other command transmitting devices, such as a remote control device (e.g., remote control device 328). The device configuration interface may also provide a menu for configuring which command(s) from the command transmitting device (e.g., remote control device) may trigger the accessory device to initiate or exit the interface. As yet another example, the device configuration interface may also provide a menu for configuring which command signals transmitted from the command transmitting device (e.g., remote control device) that the accessory device may associate with particular computing devices. In one embodiment, the accessory device may be configured to automatically execute the device configuration software application upon initialization or boot. For example, the accessory device may execute the software application after the accessory device is operatively coupled (e.g., physically engaged) to a computing device. As another example, the accessory device may execute the software application after the device receives power. As yet another example, the accessory device may execute the software application in response to a command signal or a series of command signals transmitted from a command transmitting device (e.g., remote control device). In some embodiments, the accessory device may be configured to intercept certain command signals when in a device configuration mode, such that the user may utilize the command transmitting device (e.g., remote control device) to navigate through the device configuration interface.

In another embodiment, the accessory device may be configured to store in memory data identifying one or more computing devices. The manner in which accessory device 350 communicates with a particular computing device may vary depending on the type of device(s) being monitored. In this example, accessory device 350 may be programmed or configured to communicate with one or more specific models and/or types of computing devices. In one embodiment, accessory device 350 may be programmed to communicate with one or more models of a computing device, such as STB 112. In another embodiment, accessory device 350 may be programmed to communicate with one or more types of computing devices, such as an audio device, television, and/or security system.

The configuration at step 401 may include establishing the parameters and conditions by which the accessory device will monitor a frequency band for signals transmitted between a command transmitting device, such as remote control device 328, and one or more target computing devices, such as target computing device 360. In some embodiments, accessory device 350 may be configured to sequentially or simultaneously monitor a plurality of frequency bands for incoming RF signals. In other embodiments, accessory device 350 may be configured to periodically monitor one or more frequency bands for incoming RF signals. In one of these embodiments, accessory device may be configured to monitor a different frequency band after waiting a predetermined time period without detecting a specific RF signal (e.g., command signal) on the current frequency band.

At step 402, a computing device, such as accessory device 350, may initiate communication with a target computing device. In one embodiment, accessory device may initiate communication with a target computing device, such as first target device 340, after the accessory device has been operatively coupled to the target device. For example, the accessory device may initiate communication with first target device 340 after the accessory device has been physically engaged with the target computing device via a video interface port. As another example, the accessory device may initiate communication with first target device 340 after the accessory device has been physically engaged with the target computing device via a communication port (e.g., USB port, HDMI port, etc.). During step 402, the accessory device may transmit and/or receive device information from the target computing device. In one embodiment, the accessory device may receive information identifying the model and/or type of the target computing device. In other embodiments, accessory device 350 may transmit data to the target computing device for output to one or more devices operatively coupled to the target device, such as a display device. For example, accessory device may transmit information to first target device 340 for output to a display device.

In some embodiments where the accessory device is integrally formed within a computing device, such as an audio device, the system may initiate communication with a target computing device by transmitting an ACK signal to the device. In one of these embodiments, the accessory device may initiate communication with a target computing device by transmitting the ACK signal to the target device. In another of these embodiments, the accessory device may be configured to communicate with the target computing device. In yet another of these embodiments, the accessory device may retrieve information from memory relating to a model and/or type of the target computing device. In other embodiments here the accessory device is integrally formed within a computing device, the system may skip step 402.

At step 403, the system may begin to monitor (e.g., eavesdrop on) one or more frequency bands for discovery signals and other information transmitted between a command transmitting device and a target computing device. In some embodiments, the accessory device may monitor on one or more frequency bands for discovery signals from a command transmitting device in furtherance of initiating an intercepting relationship. In one of these embodiments, the accessory device may monitor a first frequency band for a predetermined period of time. As an example, the predetermined period of time may be defined by a communication protocol, such as an RF4CE communication protocol. If the accessory device detects a discovery signal, it will continue to monitor the first frequency band for discovery response signals for the predetermined period of time. If the accessory device does not detect a discovery signal within the predetermined period of time, the accessory device may begin monitoring a second frequency band for discovery request signals and/or discovery response signals. The accessory device may be configured to store in memory information associating a captured discovery response signal with the target computing device that transmitted the response signal. The accessory device may store in memory information identifying the frequency band that the target computing device utilized to transmit the discovery response signal.

In some embodiments, accessory device 350 may be configured begin monitoring (e.g., eavesdropping on) one or more frequency bands for discovery signals and other information after receiving a monitoring command signal. For example, the accessory device may recognize a command signal that will initiate a monitoring (or eavesdropping) mode, wherein the accessory device 350 may begin monitoring (e.g., eavesdropping on) one or more frequency bands for discovery signals. In this example, the command signal may be transmitted by a command transmitting device (e.g., remote control device). In another example, the accessory device may include one or more buttons, such that actuating the one or more buttons may cause the dongle to initiate the monitoring mode. In some embodiments, the accessory device may remain in the monitoring mode for a predetermined period of time. In one of these embodiments, the accessory device may be configured to ignore any discovery signals that are not received while in the monitoring mode. For example, if the monitoring mode is configured or programmed to last 30 seconds, any discovery signals received after 30 seconds of initiating the monitoring mode may be ignored by the accessory device.

In other embodiments, the accessory device may be configured to store identification data associated with any device (e.g., a command transmitting device) that has sent a discovery signal that was ignored by the accessory device. For example, the accessory device may store in memory a MAC address for a command transmitting device (e.g., remote control device) that sent a discovery signal that was ignored by the accessory device. As another example, the accessory device may store in memory a globally unique identifier ("GUID") associated with a device that sent a discovery signal that was ignored by the accessory device. It is to be understood that a variety of other identifiers may be utilized to identify a command transmitting device without departing from the scope of the present disclosure. In some of these embodiments, the accessory device may be configured to ignore subsequent RF signals or other data transmitted from a device that has sent a discovery signal that was ignored by the accessory device. For example, the accessory device may receive an RF signal or other data over a frequency band and then determine the identity of the transmitting device. The accessory device may compare the identity of the transmitting device to a database of identifiers associated with devices (e.g., remote control devices) whose data transmissions may be ignored by the accessory device. As will be discussed further below, if the identifier for the transmitting device matches an identifier in the database, the accessory device may be configured to ignore any data transmission signals from that device.

As discussed above, the accessory device may be configured to establish an intercepting relationship with a command transmitting device (e.g., remote control device) by capturing pairing, key, and validation information communicated over a network between the command transmitting device and the target computing device during a pairing process. The intercepting relationship permits the accessory device to capture sufficient information transmitted between the command transmitting device and a target device, such that the accessory device may begin intercepting RF signals and other data transmitted between the command transmitting device and the target computing device. In some embodiments, the accessory device may be configured to use the same algorithm as a command transmitting device to rank potential computing devices to pair with (e.g., pairing candidate devices). In one of these embodiments, the accessory device may monitor the frequency band for pairing and other information associated with the highest ranked potential pairing candidate device. During step 403, the accessory device may store in memory information captured during the pairing process between the command transmitting device and the target computing device. In some embodiments, the accessory device may generate pairing tables to associate pairing information with particular command transmitting devices.

In some embodiments, the accessory device may establish a pairing relationship with the target computing device, (e.g., first target device 340). For example, the accessory device may establish an RF4CE pairing relationship with the target computing device. In one of these embodiments, the accessory device may be configured to automatically track the one or more frequency bands utilized by the target computing device and the command transmitting device (e.g., remote control device) to transmit RF signals and other data.

At step 404, the system may request additional device configuration information relating to the intercepting relationship established at step 403. The accessory device may be configured to output to a display device a device configuration interface. In one of these embodiments, a user may be prompted to input one or more preferences associated with the command transmitting device that was paired during step 403. For example, one or more menus or status indicators available on the device configuration interface may prompt the user to identify one or more command associated with the command transmitting device that may be monitored by the accessory device.

The device configuration interface may also prompt the user to provide input associating one or more commands for the command transmitting device (e.g., remote control device) with specific control operations or functions for the target computing device that was paired with the command transmitting device at step 403. For example, the user may associate a menu command from the command transmitting device to initiate a device configuration interface for the target computing device. As another example, the user may associate a menu command from the command transmitting device to initiate a device configuration interface for the accessory device. In other embodiments, the user may identify one or more commands to associate with control operations for other target computing devices detected or identified by the accessory device. For example, the user may associate the volume up (+) command to be associated with the volume up (+) function of a target computing device detected by the accessory device, such as secondary target device 360.

At step 405, the system may identify one or more other computing devices for establishing a pairing relationship. In one embodiment, the accessory device may identify one or more other computing devices (e.g., computing devices other than the target computing device paired during step 403) for establishing a pairing relationship. In some embodiments, the accessory device may be configured to detect the presence of one or more other computing devices within a certain distance from the accessory device. In another embodiment, the accessory device may detect a computing device by intercepting a signal (e.g., discovery response signal) transmitted from the computing device. In this example, the accessory device may first detect a discovery signal transmitted from a command transmitting device (e.g., a remote control device), and may subsequently monitor a frequency band to capture any discovery response signals transmitted from a previously unidentified computing device.

In another embodiment, the accessory device may receive information identifying one or more other computing devices for establishing a pairing relationship. For example, a menu in the device configuration interface may prompt the user to identify one or more other computing devices for which the accessory device may potentially establish a pairing relationship. The device configuration interface may be further configured to receive input information from a user associating a computing device detected by the accessory device with a computing device identified by the user.

At step 406, the system may begin a loop that is performed for each computing device detected and/or identified at step 405. In one embodiment a computing device, such as accessory device 350, may begin a loop that is performed for each device detected and/or identified at step 405. At step 407, for each computing device analyzed in the loop, the accessory device may establish a pairing relationship with the device, and subsequently perform further device configuration. As will be appreciated, the process for pairing a computing device to the accessory device and performing any device configuration may be similar to the process described in steps 403 and 404. For example, the accessory device may monitor one or more frequency bands for signals transmitted from the one or more other computing devices identified during step 406. As discussed above, the accessory device may be configured to capture and store in memory pairing and other information transmitted between the identified computing device and a corresponding command transmitting device (e.g., remote control device). The accessory device may utilize the captured information to establish a pairing relationship with the computing device analyzed during step 406, such as secondary target device 360. After establishing a pairing relationship and performing any necessary device configuration for the one or more devices analyzed at steps 406 and 407, the system may continue to monitor one or more frequency bands for RF signals.

Figure 5:
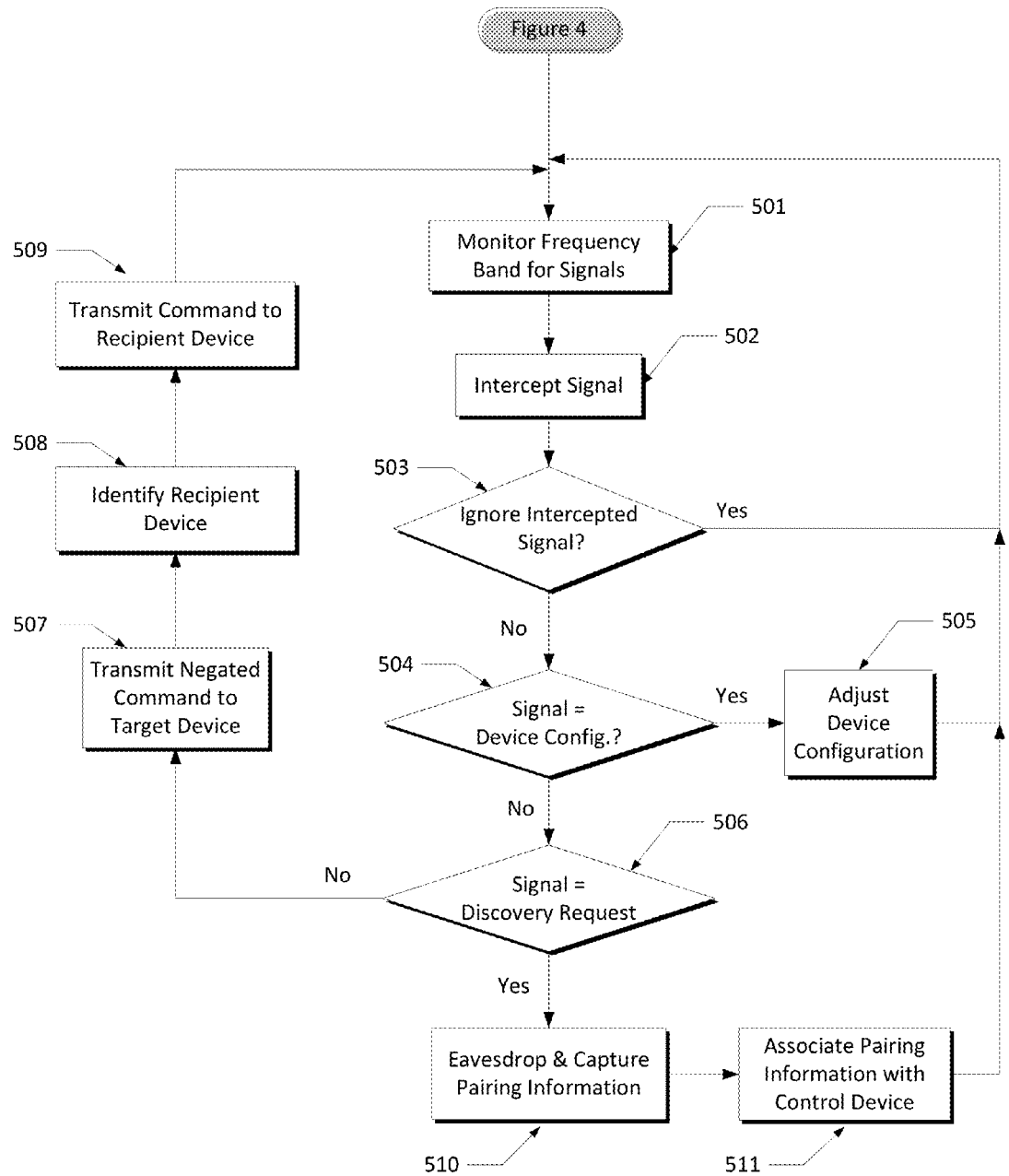
FIG. 5 illustrates an exemplary flow chart of a method in accordance with one or more aspects of the present disclosure.

FIG. 5 depicts a flowchart for an exemplary method according to one embodiment of the disclosure, which can be performed by one or more computing devices such as accessory device 350 or any other desired computing device. When describing the steps of the method below, the term "system" will be used when referring to each component, either singularly or collectively, employed at each step of the method. Such usage is merely for ease in discussing the method, and should not be interpreted as limiting the exact embodiment in which the following method may be performed.

At step 501, the system may monitor one or more frequency bands for RF signals from a command transmitting device, such as a remote control device. In some embodiments, a computing device, such as accessory device 350, may monitor one or more frequency bands for RF signals, such as command signals, from a command transmitting device. In some embodiments, the accessory device may monitor one or more frequency bands for command signals from one or more command transmitting devices that have been identified by the system. As will be discussed in more detail below, the accessory device may store in memory an identifier associated with a command transmitting device that was detected by the accessory device. The system may utilize the identifier to determine whether a subsequent RF signal communicated on a frequency band was transmitted from a previously identified command transmitting device. As will be discussed in more detail below, if the system detects a signal transmitted from a command transmitting device that was not previously identified, the system may be configured to ignore that signal or attempt to establish an intercepting relationship with that command transmitting device.

In one embodiment, accessory device 350 may monitor one frequency band for RF signals from a command transmitting device. For example, accessory device may monitor a particular frequency band (e.g., channel 15, 20, or 25) for RF signals transmitted from a command transmitting device. In another embodiment, the accessory device may begin monitoring a different frequency band (e.g., channel) after monitoring the initial frequency bad for a predetermine period of time without detecting an RF signal from a command transmitting device. In other embodiments, accessory device 350 may simultaneously monitor multiple frequency bands for an RF signal. For example, accessory device 350 may be configured to simultaneously monitor channels 15, 20, and 25 for an RF signal from a command transmitting device. In other embodiments, the system may be configured to monitor one or more frequency bands for RF signal transmitted from one or more command transmitting devices previously identified or detected by the system.

In some embodiments, the system may monitor one or more frequency bands for confirmation signals transmitted from a target computing device in response to a command signal transmitted from a command transmitting device, such as a remote control device. If the system does not intercept (e.g., capture) a confirmation signal after waiting a predetermined period of time, the system may being monitoring a different frequency band for a retransmission of the command signal by the command transmitting device. The system may continue to monitor different frequency bands until it intercepts a confirmation signal from the target computing device.

The system may be configured to store in memory information identifying the frequency band on which the confirmation signal was detected. The system may associate, in a database, the information identifying the frequency band with an identifier for the command transmitting device that transmitted the command signal.

At step 502, the system may intercept a signal transmitted from a command transmitting device to a target computing device. In some embodiments, a computing device, such as accessory device 350, may intercept a signal transmitted from a command transmitting device, such as remote control device 328 to a target computing device. As will be appreciated, the system may be configured to intercept signals associated with command transmitting devices having established an intercepting relationship with the system. For example, an accessory device may intercept a discovery signal from a first command transmitting device (e.g., a remote control device). If the accessory device fails to establish an intercepting relationship with the first command transmitting device, the accessory device may not intercept subsequent command signals from the first command transmitting device because no intercepting relationship was established. As will be appreciated, while an accessory device may intercept a discovery signal from a command transmitting device, the accessory device may not intercept subsequent command signals transmitted from the command transmitting device if an intercepting relationship is not then established. As will be discussed further below, there are a variety of signals that the accessory device may intercept, such as a discovery signal, a command signal, a device configuration signal, etc.

After intercepting the signal, the method may proceed to step 503, where the system may determine whether to ignore the intercepted (e.g., captured) signal. In some embodiments, a computing device, such as accessory device 350, may process the signal intercepted at step 502 to determine whether to ignore the intercepted signal. In one of these embodiments, the accessory device may retrieve from memory data identifying whether the intercepted signal may be ignored. In other embodiments, the accessory device may ignore captured signals associated with a command that the accessory device has been configured to ignore. For example, the system may ignore any incomplete or inadequate signals transmitted from a command transmitting device. As another example, the accessory device may ignore command signals transmitted from a command transmitting device that has not been previous detected or identified by the system. In some embodiments, the accessory device may ignore certain command signals transmitted to a target computing device, such as first target device 340.

If the intercepted signal transmitted from a command transmitting device may be ignored, the method may proceed to step 501, where the system may continue to monitor one or more frequency bands for signals. If the intercepted signal transmitted from a command transmitting device may be accepted (e.g., not ignored), the method may proceed to step 504, where the system may determine whether the signal comprises a device configuration signal. During step 504, in some embodiments, the system may process the incoming signal to determine whether a computing device, such as accessory device 350, may initiate a device configuration mode. In one of these embodiments, the accessory device may provide a device configuration interface to a user for navigating a variety of configuration menus and options relating to the accessory device. For example, the device configuration interface may provide one or more options for adjusting a mode or state of a target computing device. As another example, the interface may provide one or more options for adjusting the functionality of the accessory device.

In other embodiments where the accessory device is operatively coupled (e.g., physically engaged) to a target computing device, the system may process the intercepted signal to determine whether the signal comprises a signal instructing the accessory device to transmit a command to the target computing device. In one of these embodiments, a CEC signal transmitted from the accessory device may instruct the target computing device to adjust one or more modes or states of the target computing device. In another of these embodiments, the CEC signal transmitted from the accessory device may instruct the target computing device to initiate a device configuration mode. In some embodiments, the system may process the intercepted signal to determine whether the signal comprises an instruction for a target computing device, such as first target device 340, to initiate a device configuration mode. In one of these embodiments, the target computing device may provide a user with a configuration interface for navigating a variety of options for configuring the target computing device. For example, the interface may provide one or more options for adjusting a mode or state of the target computing device. As another example, the interface may provide one or more options for adjusting the functionality of the target computing device.

If the signal transmitted from a command transmitting device comprises a device configuration signal, the method may proceed to step 505, where the system may adjust the device configuration for one or more other computing devices. In some embodiments, the system may receive input data via an interface identifying one or more device configuration adjustments for a target computing device. For example, during step 505, the system may receive input data identifying one or more command signals for a target computing device to ignore. In other embodiments, the system may receive input data via an interface identifying one or more device configurations for an accessory device. For example, during step 505 the system, may receive input data identifying one or more commands to associate with a computing device, such as second target computing device 360.

After the device configuration is complete, the method may proceed to step 501, where the system may continue to monitor one or more frequency bands for RF signals. If the signal transmitted from the command transmitting device does not comprise a device configuration signal, the method may proceed to step 506, where the system may determine whether the incoming signal comprises a discovery request signal. If the incoming signal transmitted from a command transmitting device comprises a discovery request signal, the method may proceed to step 510, where the system may monitor one or more frequency bands for a discovery response signal transmitted from a target computing device in response to the captured discovery request signal. In most embodiments, the target computing device may respond to a discovery request signal using the same frequency band that the command transmitting device utilized to transmit the discovery request signal. Accordingly, in such embodiments, the system may monitor the same frequency band used to detect the discovery request signal. In other embodiments, the system may monitor a plurality of frequency bands to identify and capture a signal transmitted in response to a discovery request signal. In one of these embodiments, the system may monitor a first frequency band in the plurality of frequency bands for a predetermined period of time before monitoring a different frequency band for the discovery response signal.

During step 510, the system may capture data transmitted between the command transmitting device and a target computing device during a pairing process, such as the pairing process discussed in reference to FIG. 3. For example, the system may capture pairing, key, and validation information transmitted between the command transmitting device (e.g., remote control device) and the target computing device. The captured information may include any information sufficient and/or necessary for the target computing device and the command transmitting device to establish a pairing relationship under a binding protocol, such as the RF4CE protocol. For example, during step 501, the system may capture key information (e.g., a pairing key) transmitted from the target computing device to the command transmitting device during the pairing process. As another example, the system may capture (e.g., intercept) information relating to one or more validation procedures performed by the target computing device and the command transmitting device during the pairing process.

After the system has captured the pairing, key, validation, and other information transmitted between the command transmitting device and the target computing device, the method may proceed to step 511 where the system may associate the information captured during step 510 with the corresponding command transmitting device (i.e., the command transmitting device that transmitted the discovery signal analyzed at step 506). The system may store in memory an identifier for the corresponding command transmitting device such that the system may uniquely identify the command transmitting device. For example, the identifier may comprise the network address of the command transmitting device (e.g., remote control device). In some embodiments, the system may associate in a database the identifier for the command transmitting device and the pairing information captured during step 510. In one of these embodiments, the system may store in memory key information indexed by the network address of the command transmitting device associated with the key information (e.g., the command transmitting device that transmitted the discovery signal analyzed at step 506). After the system associates the pairing and other information captured during step 510 with the corresponding command transmitting device, the method may proceed to step 501, where the system may continue to monitor one or more frequency bands for RF signals.

Referring back to step 506 in FIG. 5, if the incoming signal transmitted from a command transmitting device does not comprise a discovery request signal, the method may proceed to step 507, where the system may transmit a negating signal (e.g., the signal intercepted at step 502) to a computing device. In one embodiment, a computing device, such as accessory device 350, may transmit a negating command to a target computing device, such as first target device 340. For example, if the incoming signal is a volume up (+) command for the target computing device, the accessory device may transmit a negating command signal (i.e., a volume down (−) signal) to the target device to mitigate (e.g., negate) the impact of the initial incoming signal at the target computing device. In one embodiment, the system may wait a predetermine period of time after detecting the incoming signal prior to transmitting the negating signal. In some embodiments, the system may skip performing step 507. In one of these embodiments, the system may not perform step 507 if the accessory device has not established a pairing relationship with the target device. In another of these embodiments, the system may not perform step 507 if the target device has already been configured to ignore the incoming signal.

At step 508, the system may identify a computing device to receive a signal corresponding to the signal intercepted at step 502. In one embodiment, the accessory device may identify a target computing device, such as second target computing device 360, to receive the corresponding signal. In some embodiments, the accessory device may retrieve from memory information identifying a target computing device to receive the corresponding signal. For example, if the incoming signal comprises a volume up (+) command signal, the accessory device may retrieve from memory the identity of the computing device associated with the volume up (+) command signal. In embodiments where the accessory device is integrated into the target computing device, the system may skip step 508.

After identifying the recipient target computing device, the method may proceed to step 509, where the system may transmit a signal, corresponding to the signal intercepted at step 502, to the computing device identified in step 509. In some embodiment, the accessory device may transmit a signal, corresponding to the signal intercepted at step 502, to the computing device identified in step 509. After the signal has been transmitted to the computing device identified in step 509, the computing device receiving the corresponding signal may perform the one or more commands associated with that signal. For example, if the incoming signal comprises a volume up (+) command, the target computing device (e.g., audio device) receiving the corresponding command signal from the accessory device may perform the command (i.e., increasing the volume). In embodiments where the accessory device is integrated into the target computing device, the system may not re-transmit the intercepted signal. Instead, the accessory device may communicate with the target device to perform the one or more commands associated with the intercepted signal. For example, the accessory device may send instructions for the target computing device (e.g., audio device) to perform the one or more commands associated with the intercepted signal (e.g., increase the volume). In some embodiments, steps 508 and 509 may be performed simultaneously. After transmitting the signal to the recipient target computing device, the method may proceed to step 501, where the system may continue to monitor one or more frequency bands for incoming RF signals.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
monitoring, by a computing device, pairing communications exchanged between a first command transmitting device and a first target device to obtain a first pairing key;
storing information indicating a first subset of commands of the first command transmitting device for the computing device to intercept;
monitoring, by the computing device, command data transmitted from the first command transmitting device to the first target device;
determining, at the computing device, that the command data corresponds to a first command in the first subset of commands;

in response to the determining that the command data corresponds to the first command, using the first pairing key to receive the command data; and in response to receiving the command data, transmitting, to a second target device, a command signal corresponding to the first command in the first subset of commands.

2. The method of claim 1, wherein the monitoring pairing communications further comprises:

monitoring a first frequency band for a discovery signal transmitted from the first command transmitting device.

3. The method of claim 2, wherein the monitoring a first frequency band is performed by the computing device for a predetermined time period before a second frequency band is monitored.

4. The method of claim 1, further comprising:

receiving, via a user interface, input associating the first command with a first control operation of the second target device.

5. The method of claim 1, further comprising:

associating, in a database, information relating to the first pairing key with an identifier for the first command transmitting device.

6. The method of claim 1, further comprising:

receiving, via a user interface, input indicating a plurality of commands of the first command transmitting device to comprise the first subset of commands.

7. The method of claim 1, further comprising:

monitoring pairing communications between a second command transmitting device and the first target device to obtain a second pairing key; and using the second pairing key to receive commands transmitted from the second command transmitting device to the first target device.

8. The method of claim 1, further comprising:

initiating, at the computing device, a first device configuration mode for a first time period;

during the first time period, monitoring the command data for a second subset of commands;

determining, at the computing device, that the command data corresponds to a first command in the second subset of commands; and executing, at the computing device, the first command in the second subset of commands.

9. The method of claim 1, further comprising:

in response to the determining that the command data corresponds to the first command, transmitting to the first target device a second command negating the first command.

10. The method of claim 1, further comprising:

receiving, a first volume-up command transmitted from the first command transmitting device to the first target device;

in response to receiving the first volume-up command, transmitting to the second target device a second volume-up command; and in response to receiving the first volume-up command, transmitting to the first target device a volume down command.

11. A method comprising:

receiving, at a computing device, a discovery request signal transmitted from a first command transmitting device;

identifying a first frequency band associated with a discovery response signal transmitted from a first target device;

receiving, at the computing device, a first pairing response signal transmitted from the first target device;

receiving, at the computing device, a first pairing key transmitted from the first target device;

receiving, at the computing device, data transmitted from the first command transmitting device, wherein the data is utilized to validate the first pairing key;

monitoring the first frequency band for a command signal transmitted from the first command transmitting device; and transmitting, from the computing device to a second target device, data corresponding to the command signal.

12. The method of claim 11, further comprising:

monitoring a second frequency band for the discovery request signal transmitted from the first command transmitting device.

13. The method of claim 11, further comprising:

receiving, from the first command transmitting device, a predetermined series of command signals for initiating a device configuration interface.

14. The method of claim 11, further comprising:

receiving, at the computing device, user input associating an encrypted command signal with a control operation for the second target device.

15. A non-transitory computer-readable medium containing computer-executable instructions for causing a computer device to perform the steps of:

monitoring pairing communications exchanged between a first command transmitting device and a first target device to obtain a first pairing key;

storing information indicating a first subset of commands of the first command transmitting device for the computing device to intercept;

monitoring command data transmitted from the first command transmitting device to the first target device;

determining that the command data corresponds to a first command in the first subset of commands;

in response to the determining that the command data corresponds to the first command, using the first pairing key to receive the command data; and in response to receiving the command data, transmitting, to a second target device, a command signal corresponding to the first command in the first subset of commands.

16. The non-transitory computer-readable medium of claim 15, wherein the computer-executable instructions, when executed, further cause the computer device to perform:

monitoring a first frequency band for a discovery signal transmitted from the first command transmitting device.

17. The non-transitory computer-readable medium of claim 15, wherein the computer-executable instructions, when executed, further cause the computer device to perform:

receiving, via a user interface, input associating the first command with a first control operation of the second target device.

18. The non-transitory computer-readable medium of claim 15, wherein the computer-executable instructions, when executed, further cause the computer device to perform:

receiving, via a user interface, input indicating a plurality of commands of the first command transmitting device to comprise the first subset of commands.

19. The non-transitory computer-readable medium of claim 15, wherein the computer-executable instructions, when executed, further cause the computer device to perform:

monitoring pairing communications between a second command transmitting device and the first target device to obtain a second pairing key; and using the second pairing key to receive commands transmitted from the second command transmitting device to the first target device.

20. The non-transitory computer-readable medium of claim 15, wherein the computer-executable instructions, when executed, further cause the computer device to perform:
- initiating, at the computing device, a first device configuration mode for a first time period;
- during the first time period, monitoring the command data for a second subset of commands;
- determining, at the computing device, that the command data corresponds to a first command in the second subset of commands; and
- executing, at the computing device, the first command in the second subset of commands.

* * * * *